(12) United States Patent
Clemens et al.

(10) Patent No.: US 6,295,570 B1
(45) Date of Patent: Sep. 25, 2001

(54) USING MULTIPLE SERIAL BUS DEVICES WITH A DRIVER PROGRAM

(75) Inventors: Bruce P. Clemens, Phoenix; Mannan A. Mohammed; Sasi Kumar, both of Chandler, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/216,526

(22) Filed: Dec. 18, 1998

(51) Int. Cl.$^7$ ........................................ G06F 13/10
(52) U.S. Cl. ............................ 710/129; 710/107
(58) Field of Search .......................... 710/100, 101, 710/102, 103, 126, 129, 107

(56) References Cited

U.S. PATENT DOCUMENTS

| | | | |
|---|---|---|---|
| 5,128,664 | * | 7/1992 | Bishop ........................ 340/825.7 |
| 5,611,055 | * | 3/1997 | Krishan et al. ................... 710/101 |
| 5,613,157 | * | 3/1997 | Davidson et al. .................... 710/8 |
| 5,819,112 | * | 10/1998 | Kusters ............................ 710/36 |
| 5,890,015 | * | 3/1999 | Garney et al. .................... 710/101 |
| 5,903,777 | * | 5/1999 | Brief ............................... 710/60 |
| 6,061,746 | * | 5/2000 | Stanley et al. ..................... 710/10 |
| 6,073,188 | * | 6/2000 | Fleming ........................... 710/38 |
| 6,105,097 | * | 8/2000 | Larkey et al. .................... 710/129 |
| 6,119,195 | * | 9/2000 | Ellis et al. ...................... 710/129 |

\* cited by examiner

*Primary Examiner*—Glenn A. Auve
(74) *Attorney, Agent, or Firm*—Trop, Pruner & Hu, P.C.

(57) ABSTRACT

A method for using a driver program to communicate with multiple serial bus devices includes selecting one of the serial bus devices and automatically coupling the selected serial bus device to a computer. The other serial bus devices are isolated from the computer, and the driver program is executed to communicate with the selected serial bus device.

46 Claims, 4 Drawing Sheets

USING MULTIPLE SERIAL BUS DEVICES WITH A DRIVER PROGRAM

BACKGROUND

The invention relates to using multiple serial bus devices with a driver program.

Referring to FIG. 1, for the purpose of electrically capturing an optical image 11, a typical digital camera 12 (of a digital imaging system 21) may include an array of photon sensing pixel sensors 20. During an integration interval, each pixel sensor 20 typically measures the intensity of a portion, or pixel, of a representation of the optical image that is focused (by optics of the camera 12) onto the pixel sensors 20. At the expiration of the integration interval, each sensor 20 typically indicates (via an analog voltage, for example) an intensity of light of the pixel.

The camera 12 typically processes the indications from the pixel sensors 20 to form a frame of data which digitally represents the captured image. The frame may be transferred via a serial bus 15 (a Universal Serial Bus (USB), for example) to a computer 14 for viewing or stored in a flash memory of the camera 12. During video operations, the camera 12 may capture several optical images in succession and furnish several frames of data to the computer 34, each of which indicates one of the captured images. The computer 14 may then use the frames to recreate the captured video on a display 9.

The computer 14 typically executes driver programs to communicate with devices that are coupled to the serial bus 15. Quite often, the driver program may be designed for communication with only one bus device. For example, a camera driver program 17 may be designed to cause the computer 14 to communicate with one camera that is coupled to the serial bus 15. A difficulty may arise when an additional camera 18 is coupled to the bus 15, as more than one camera may exceed the driver program's capabilities.

Thus, there is a continuing need for a system that accommodates the use of multiple serial bus devices with a single device-driver program.

SUMMARY

In one embodiment, a method for using a driver program to communicate with multiple serial bus devices includes selecting one of the serial bus devices and automatically coupling the selected serial bus device to a computer. The other serial bus devices are isolated from the computer, and the driver program is executed to communicate with the selected serial bus device.

In another embodiment, an article includes a computer readable storage medium that includes instructions to cause a computer to select a serial bus device from a group of serial bus devices. The serial bus devices are capable of communicating with the computer when the computer executes a driver program. The selected serial bus device is automatically coupled to the computer, and the other serial bus devices are isolated from the computer. The driver program is executed to communicate with the selected serial bus device.

DETAILED DESCRIPTION

Figure 1:
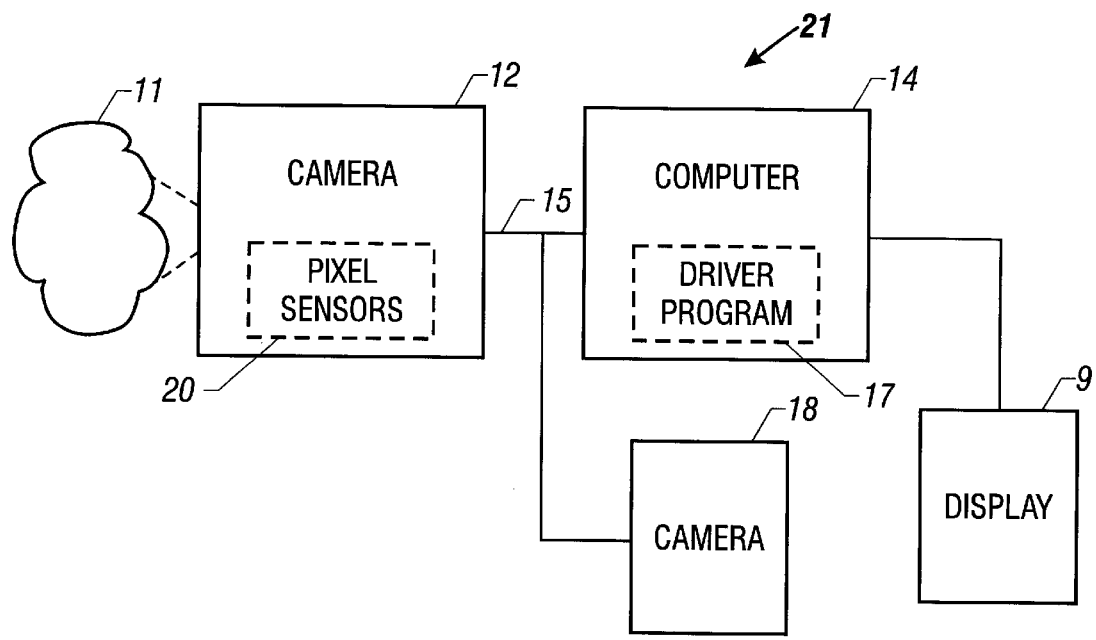
FIG. 1 is a schematic diagram of a digital imaging system of the prior art.
Figure 2:
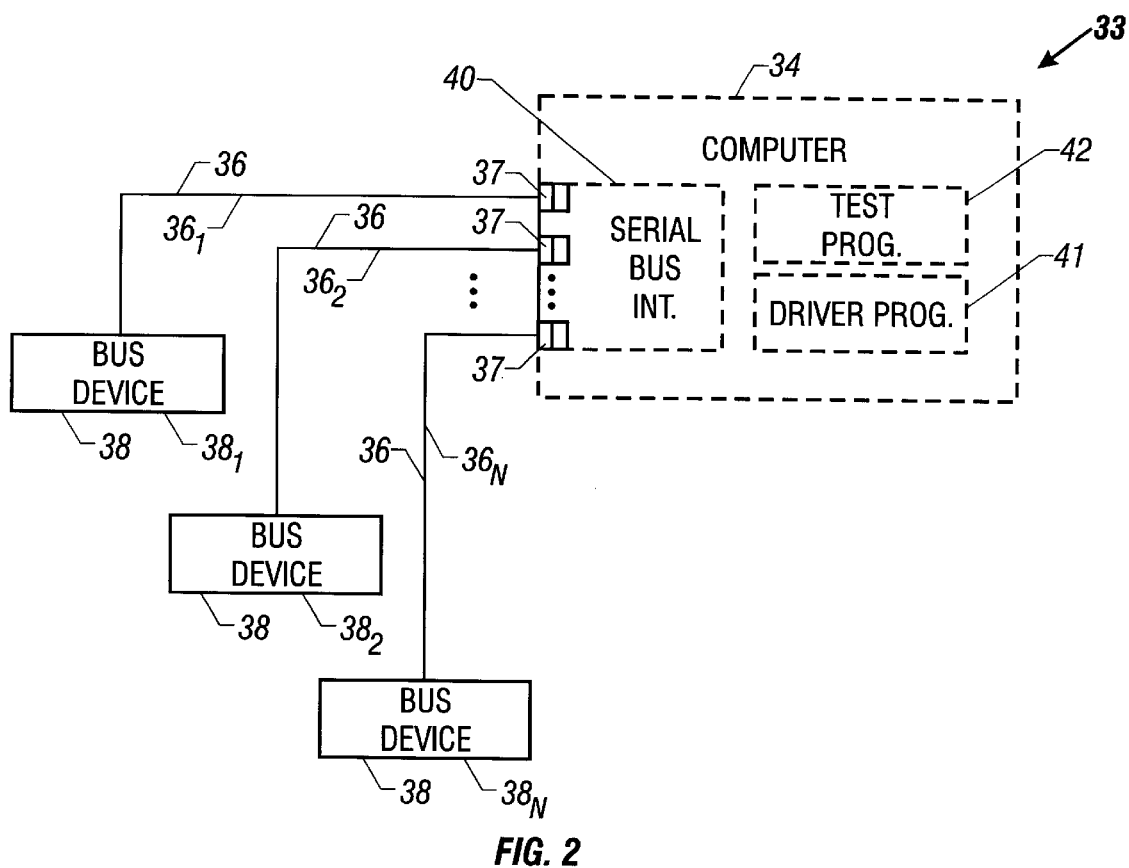
FIG. 2 is a block diagram of a digital imaging system according to an embodiment of the invention.

Referring to FIG. 2, an embodiment 33 of a digital imaging system in accordance with the invention includes a computer 34 that may execute a single device-driver program 41 to communicate with multiple serial bus devices 38 (serial bus device $38_1$, $38_2$ . . . $38_N$ as examples) that have the same type (digital cameras that are associated with the same driver program may be one type, as an example). For example, in some embodiments, the bus devices 38 may be, as examples, digital cameras, and the device-driver program 41 may be a camera driver program that the computer 34 executes to communicate with the cameras in a manner described below.

In conventional systems, a difficulty may arise in using a single device-driver program to communicate with several serial bus devices that have the same type, as the driver program expects to communicate with only one bus device. However, in the digital imaging system 33, the computer 34 includes a serial bus interface 40 that (as described below) is constructed to multiplex the serial bus devices 38 through one serial bus port (and logical connection) in a high volume/high throughput manner so that the rest of the computer 34 (excluding the serial bus interface 40) perceives that there is only one serial bus device 38 connected at any one time. As a result, the capabilities of the driver program 41 are not exceeded.

To accomplish the above-described features, each serial bus device 38 is coupled to a different associated serial bus 36 (a serial bus 36, $36_2$ . . . or $36_N$, as an example) that is coupled to the serial bus interface 40 (via a plug-type connector assembly 37, for example). In a manner described below, the serial bus interface 40, under software control, selectively couples one of the serial buses 36 to the computer 34 which permits the computer 34 to communicate with the associated serial bus device 38. In addition to coupling one of the serial bus devices 38 to the computer 34, the serial bus interface 40 isolates the remaining serial buses 36 (and the associated serial bus devices 38) from the rest of the computer 34 and thus, hides the remaining serial bus devices 38 from the driver program 41.

The advantages of the above-described arrangement may include one or more of the following: multiple serial bus devices that are not typically supported by a single device-driver program may now be supported; reliable multiport serial port hubs may now be procured; the serial bus enumeration process may be eliminated; the driver load and unload process on the computer may be eliminated; the computer may be more stable and crashes of the computer may occur less frequently; and less time may be consumed in interacting with the serial bus devices.

As an example of a scenario where multiple serial bus devices 38 that have the same type are used with a single device-driver program, the serial bus devices 38 may be cameras. In this manner, each camera typically is packaged for sale with an accompanying single camera driver program (i.e., the driver program 41). Before the cameras are shipped from the manufacturing facility, the driver program 41 is typically executed to test each camera, and as is typical, the driver program 41 may be configured to communicate with only one camera. However, the serial bus interface 40 provides a mechanism for allowing several cameras to be concurrently plugged into the interface 40 and coupling the cameras to the computer 34 (one at a time) for testing in a high throughput manner. As a result, multiple cameras may be manually coupled (plugged in, for example) to the serial bus interface 40, and a test program 42 may interact with the driver program 41 to test one camera at a time without requiring any of the cameras to be 20 plugged or unplugged from the computer 34 during testing of the cameras. Therefore, as compared to conventional testing arrangements, significant testing time is saved and modification of the driver program 41 is not required.

Another possible scenario where multiple serial bus devices 38 may be used with the driver program 41 may be a security system where the serial bus devices 38 are cameras. In the security system, several cameras are plugged into the computer 34, and the driver program 41 may cause the computer 34 to interact with one camera at a time to, for example, monitor a specified location. Because the computer 34 (excluding the bus interface 40) perceives that only one camera is coupled to the computer 34 at any one time, the driver program 41 does not need to be modified.

To accomplish the above-described functions, in some embodiments, the test program 42 (for the embodiments where the digital imaging system 33 is used for purposes of testing) may interact with the bus interface 40 to switch out a current bus device 38 after testing and switch in the next bus device 38 for purposes of testing. Thus, for example, the test program 42 may cause the computer 34 to evaluate the performance of a current bus device $38_1$, to subsequently instruct the bus interface 40 to switch out the current bus device $38_1$ and to switch in the next bus device $38_2$ for testing. Because the test program 42 (and not the driver program 41) causes the computer 34 to interact with the multiplexing functions of the bus interface 40 (as described below), the driver program 41 does not need to be modified, as the computer 34, under execution of the driver program 41, perceives that one bus device 38 is coupled to the computer 34.

Figure 3:
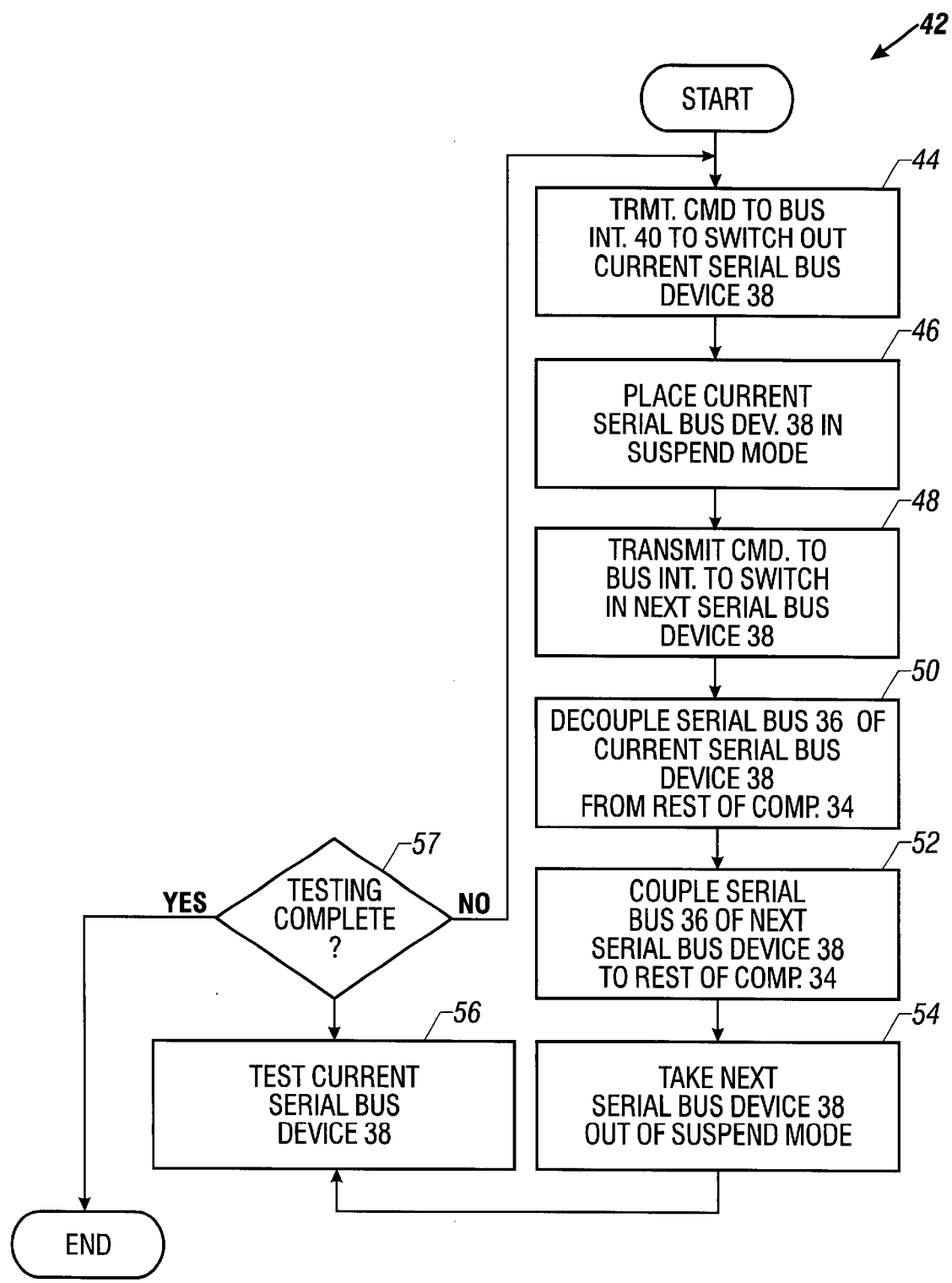
FIG. 3 is a flow diagram illustrating an algorithm to accommodate use of the serial bus devices of FIG. 2 with a device-driver program.

Referring to FIG. 3, as an example, the test program 42 may cause the computer 34 to transmit (block 44) a command to the serial bus interface 40 to switch out the current bus device 38. In response to this command, the serial bus interface 40 places (block 46) the current bus device 38 in a suspend mode. The serial bus interface 40 may accomplish this by transmitting the appropriate signals to the serial bus 36 that is associated with the current serial bus device 38. Alternatively, the serial bus interface 40 may periodically transmit a heartbeat signal (a Start of Frame (SOF) signal, for example) to the serial buses 36 that are associated with the nonselected bus devices 38 to keep the nonselected serial devices 38 inactive but yet maintain the appearance (from the nonselected serial bus devices' perspective) that the nonselected serial bus devices 38 are coupled to the computer 34.

Next, the test program 42 may cause the computer 34 to transmit (block 48) a command to the bus interface 40 to switch in the next bus device 38. In response, the serial bus interface 40 may then decouple (block 50) the serial bus 36 that is associated with the current serial bus device 38 from the rest of the computer 34 and couple (block 52) the serial bus device 36 that is associated with the next serial bus device 38 to the rest of the computer 34. Next, the computer 34 takes (block 54) the next serial bus device 38 out of the suspend mode and subsequently, tests (block 56) the next serial bus device 38 which at this point transitions in name to become the current serial bus device 38. After the test of the serial bus device 38 is complete, the computer 34 determines (diamond 57) if the testing is complete. If not, the computer 34 returns to block 44 to repeat the above-described process for another serial bus device 38.

Figure 4:
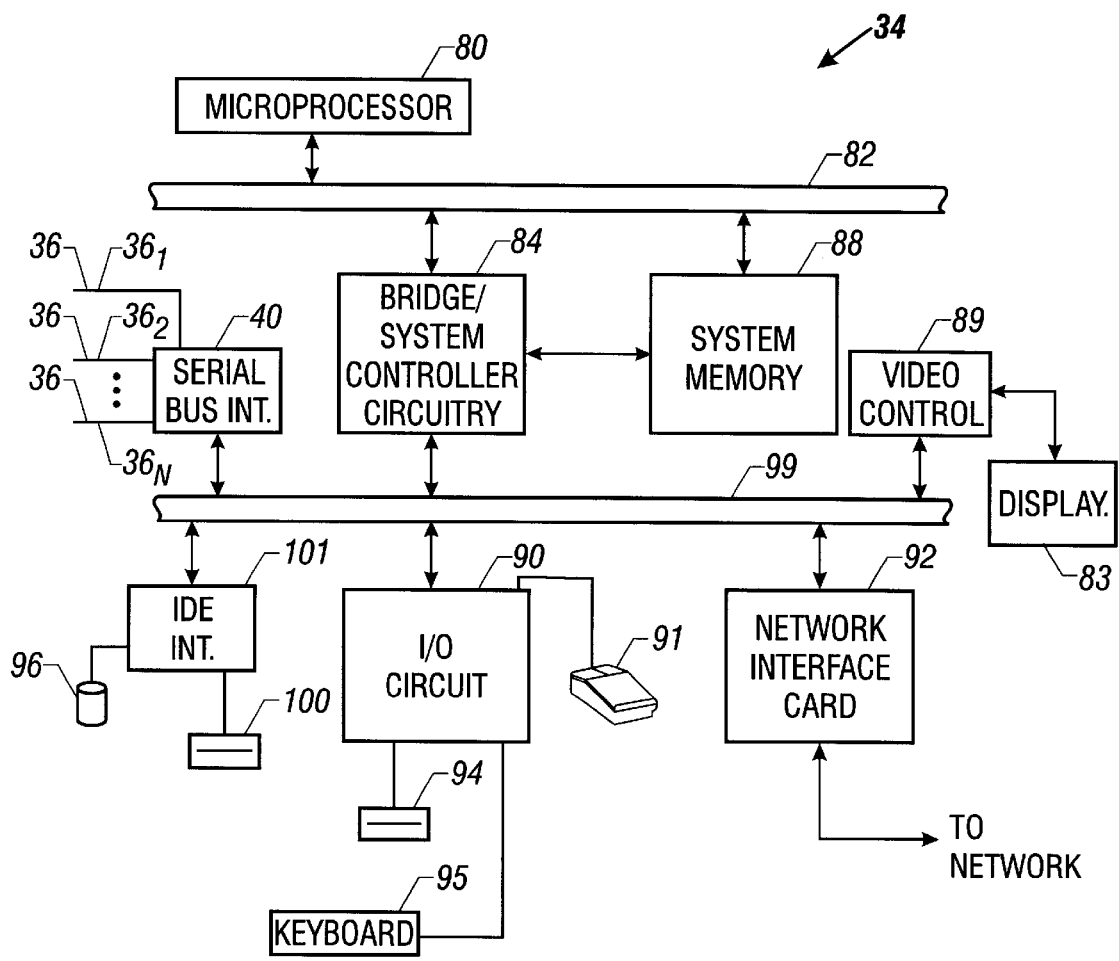
FIG. 4 is a schematic diagram of the computer of FIG. 2.

Referring to FIG. 4, besides the serial bus interface 40, the computer 34 may also include a microprocessor 80 which, in some embodiments, may execute a copy of the driver program 41 and may execute a copy of the test program 42. The execution of the test program 42 may cause the computer to select one of the serial bus devices 38 and automatically couple the selected serial bus device 38 to the computer 34; isolate the other serial bus devices 38 from the computer 34; and execute the driver program 41 to communicate with the selected serial bus device 38 (see FIG. 2).

The memory 88, the microprocessor 80 and bridge system controller circuitry 84 may be coupled to a host bus 82. The circuitry 84 may also interface the host bus 82 to a downstream bus 99 which is coupled to an input/output (I/O) controller 90 and a network interface card 92, as examples. The computer 34 may also have, as examples, a mouse 91, a floppy disk drive 94 and/or a keyboard 9that are coupled to the I/O controller 90. An Intelligent Device Electronics (IDE) interface 101 may also be coupled to the bus 99 and interface a hard disk drive 96 and a CD-ROM drive 100 to the bus 99. A video controller 89 may be coupled to the bus 99 and control a display 83.

Figure 5:
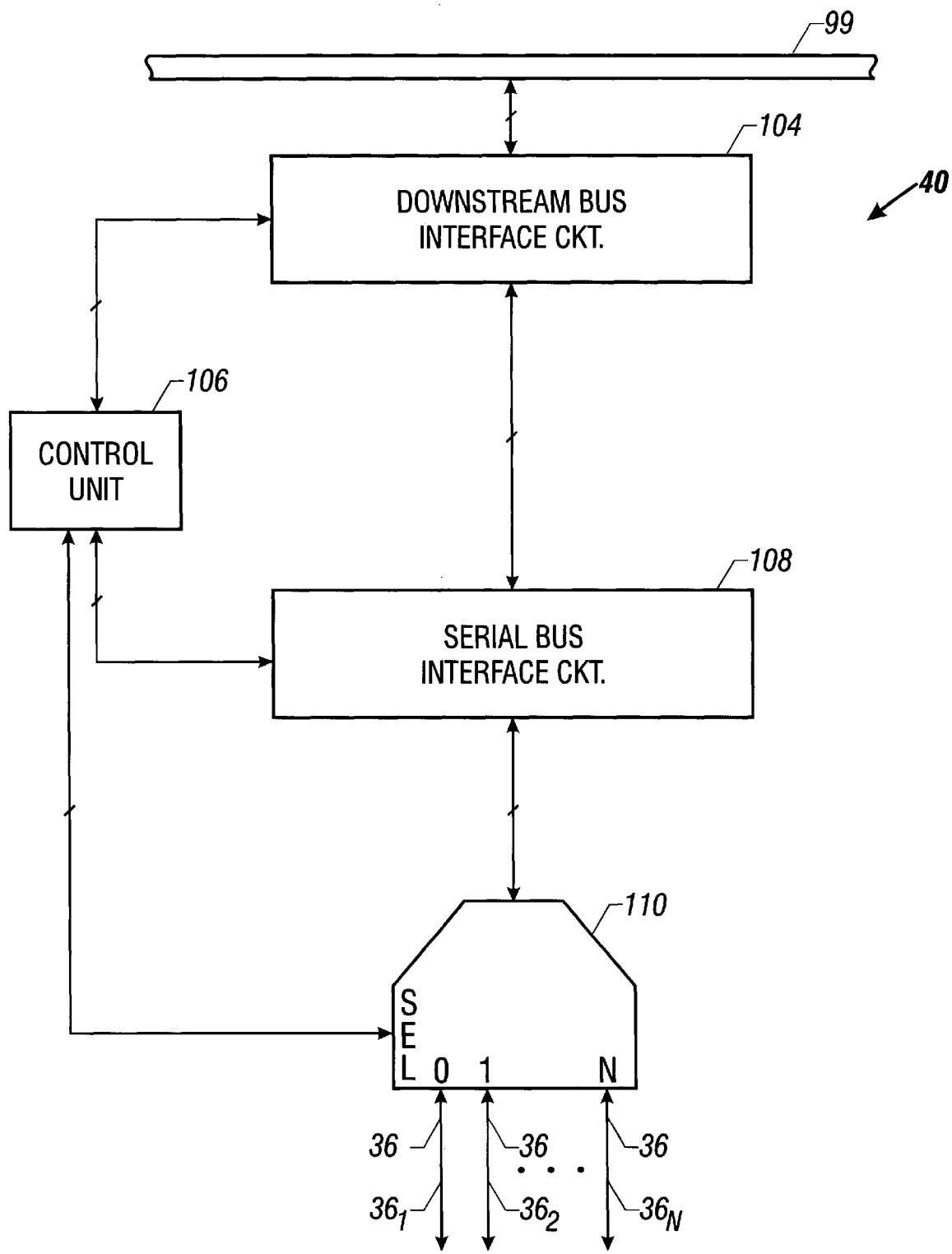
FIG. 5 is a schematic diagram of the serial bus interface of FIG. 4.

Referring to FIG. 5, the serial bus interface 40 may include a downstream bus interface circuit 104 that is coupled to the bus 99. The downstream bus interface circuit 104 receives data and commands from the bus 99, which may include, as examples, a command to place a selected serial bus device 38 in a suspend mode, a command to take a selected serial bus device 38 out of the suspend mode, a command to switch in the next serial bus device 38 and a command to switch out the current serial bus device 38. In response to these commands, a control unit 106 may interact with a bi-directional multiplexer 110 to select one of the serial bus devices 38. Thus, the multiplexer 110 selects one of the serial buses 36 to couple the associated, selected serial bus device 38 to a serial bus interface circuit 108. The selected serial bus device 38 may then communicate via the serial bus interface circuit 108 and the downstream bus interface circuit 104 to the rest of the computer system 34. Besides selecting and deselecting the serial bus devices 38, the downstream bus interface circuit 104, the control unit 106 and the serial bus interface circuit 108 perform typical functions of a serial bus interface.

While the invention has been disclosed with a respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for using a driver program to communicate with multiple serial bus devices, comprising:
   selecting one of the serial bus devices;
   in response to the selection of said one of the serial bus devices, automatically coupling the selected serial bus device to a computer;
   isolating the other serial bus devices from the computer; and
   executing the driver program to communicate with the selected serial bus device.

2. The method of claim 1, further comprising: testing the selected serial bus device.

3. The method of claim 1, wherein the act of isolating comprises: decoupling the other serial bus devices from the computer.

4. The method of claim 1 wherein the act of isolating comprises: transmitting a heartbeat signal to the other serial bus devices.

5. The method of claim 1, wherein the act of coupling comprises: taking a suspended serial bus device out of a suspended mode.

6. The method of claim 1, further comprising:
deselecting the selected serial bus device; and
automatically decoupling the deselected serial bus device from the computer.

7. The method of claim 1, wherein the act of selecting comprises:
coupling a serial bus to the computer, the serial bus being coupled to the selected serial bus device.

8. The method of claim 1, wherein the act of isolating comprises:
decoupling serial buses from the computer, the serial buses being associated with the other serial bus devices.

9. An article comprising a computer readable storage medium including instructions to cause a computer to:
select a serial bus device from a group of serial bus devices, the serial bus devices capable of communicating with the computer when the computer executes a driver program;
in response to the selection of the serial bus device, automatically couple the selected serial bus device to the computer;
isolate the other serial bus devices from the computer; and
execute the driver program to communicate with the selected serial bus device.

10. The article of claim 9, including instructions to cause the computer to test the selected serial bus device.

11. The article of claim 9, including instructions to cause the computer to decouple the other serial bus devices from the computer.

12. The article of claim 9, including instructions to cause the computer to transmit a heartbeat signal to the other serial bus devices.

13. The article of claim 9, including instructions to cause the computer to take a suspended device out of a suspended mode.

14. The article of claim 9, including instructions to cause the computer to deselect the selected serial bus device and automatically decouple the deselected serial bus device from the computer.

15. A computer system comprising:
a processor;
a serial bus interface; and
a memory storing:
a driver program to communicate with multiple serial bus devices and a serial bus device program to cause the processor to:
interact with the serial bus interface to select one of the serial bus devices,
interact with the serial bus interface to automatically couple the selected serial bus device to the computer in response to the selection of the serial bus device,
interact with the serial bus interface to isolate the other serial bus devices from the computer, and
execute the driver program to communicate with the selected serial bus device.

16. The computer system of claim 15, wherein the serial bus device program further causes the processor to test the selected serial bus device.

17. The computer system of claim 15, wherein the serial bus interface circuit comprises:
a multiplexer to selectively couple one of the serial bus devices to the processor.

18. A method for use with multiple serial bus devices, comprising:
selecting one of the serial bus devices, each of the serial bus devices being associated with a driver program shared in common; and
in response to the selection of said one of the serial bus devices, automatically coupling the selected serial bus device to a computer.

19. The method of claim 18, further comprising:
executing the driver program to communicate with the selected serial bus device.

20. The method of claim 18, wherein each of the serial bus devices comprises a digital camera.

21. A method for using a driver program to communicate with multiple serial bus devices, comprising:
selecting one of the serial bus devices;
automatically coupling the selected serial bus device to a computer;
isolating the other serial bus devices from the computer;
executing the driver program to communicate with the selected serial bus device; and
beginning the execution of the driver program after said other serial bus devices are isolated from the computer.

22. The method of claim 21, further comprising:
testing the selected serial bus device.

23. The method of claim 21, wherein the act of isolating comprises:
decoupling the other serial bus devices from the computer.

24. The method of claim 21, wherein the act of isolating comprises:
suspending the other serial bus devices.

25. The method of claim 21 wherein the act of isolating comprises:
transmitting a heartbeat signal to the other serial bus devices.

26. The method of claim 21, wherein the act of coupling comprises:
taking a suspended serial bus device out of a suspended mode.

27. The method of claim 21, further comprising:
deselecting the selected serial bus device; and
automatically decoupling the deselected serial bus device from the computer.

28. The method of claim 21, wherein the act of selecting comprises:
coupling a serial bus to the computer, the serial bus being coupled to the selected serial bus device.

29. The method of claim 21, wherein the act of isolating comprises: decoupling serial buses from the computer, the serial buses being associated with the other serial bus devices.

30. A method for using a driver program to communicate with multiple serial bus devices, comprising:
selecting one of the serial bus devices;
automatically coupling the selected serial bus device to a computer;
suspending the other serial bus devices; and
executing the driver program to communicate with the selected serial bus device.

31. The method of claim 30, further comprising:
testing the selected serial bus device.

32. The method of claim 30, wherein the act of isolating comprises:
decoupling the other serial bus devices from the computer.

33. The method of claim 30, wherein the act of isolating comprises:
transmitting a heartbeat signal to the other serial bus devices.

34. The method of claim 30, wherein the act of coupling comprises:
taking a suspended serial bus device out of a suspended mode.

35. The method of claim 30, further comprising:
deselecting the selected serial bus device; and
automatically decoupling the deselected serial bus device from the computer.

36. The method of claim 30, wherein the act of selecting comprises:
coupling a serial bus to the computer, the serial bus being coupled to the selected serial bus device.

37. The method of claim 30, wherein the act of isolating comprises:
decoupling serial buses from the computer, the serial buses being associated with the other serial bus devices.

38. An article comprising a computer readable storage medium including instructions to cause a computer to:
select a serial bus device from a group of serial bus devices, the serial bus devices capable of communicating with the computer when the computer executes a driver program;
automatically couple the selected serial bus device to the computer;
suspend the other serial bus devices; and
execute the driver program to communicate with the selected serial bus device.

39. The article of claim 38, including instructions to cause the computer to test the selected serial bus device.

40. The article of claim 38, including instructions to cause the computer to decouple the other serial bus devices from the computer.

41. The article of claim 38, including instructions to cause the computer to transmit a heartbeat signal to the other serial bus devices.

42. The article of claim 38, including instructions to cause the computer to take a suspended device out of a suspended mode.

43. The article of claim 38, including instructions to cause the computer to deselect the selected serial bus device and automatically decouple the deselected serial bus device from the computer.

44. A computer system comprising:
a processor;
a serial bus interface; and
a memory storing:
a driver program to communicate with multiple serial bus devices and a serial bus device program to cause the processor to:
interact with the serial bus interface to select one of the serial bus devices,
interact with the serial bus interface to automatically couple the selected serial bus device to the computer,
interact with the serial bus interface to suspend the other serial bus devices, and
execute the driver program to communicate with the selected serial bus device.

45. The computer system of claim 44, wherein the serial bus device program further causes the processor to test the selected serial bus device.

46. The computer system of claim 44, wherein the serial bus interface circuit comprises:
a multiplexer to selectively couple one of the serial bus devices to the processor.

* * * * *